Aug. 10, 1943.　　　　F. M. RODDY　　　　2,326,682
ROTARY CUTTING AND GRANULATING MACHINE
Filed Jan. 7, 1942　　　3 Sheets-Sheet 1
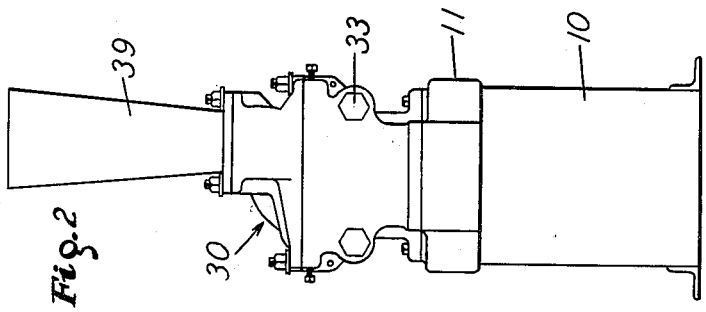
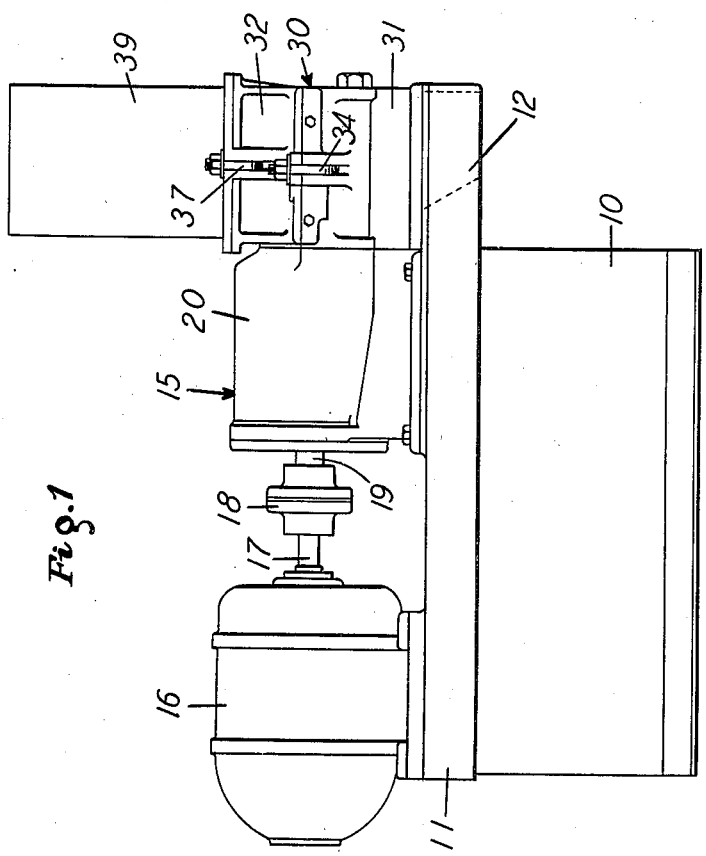
FRED M. RODDY
INVENTOR
By
N Russell Greenwood
ATTORNEY

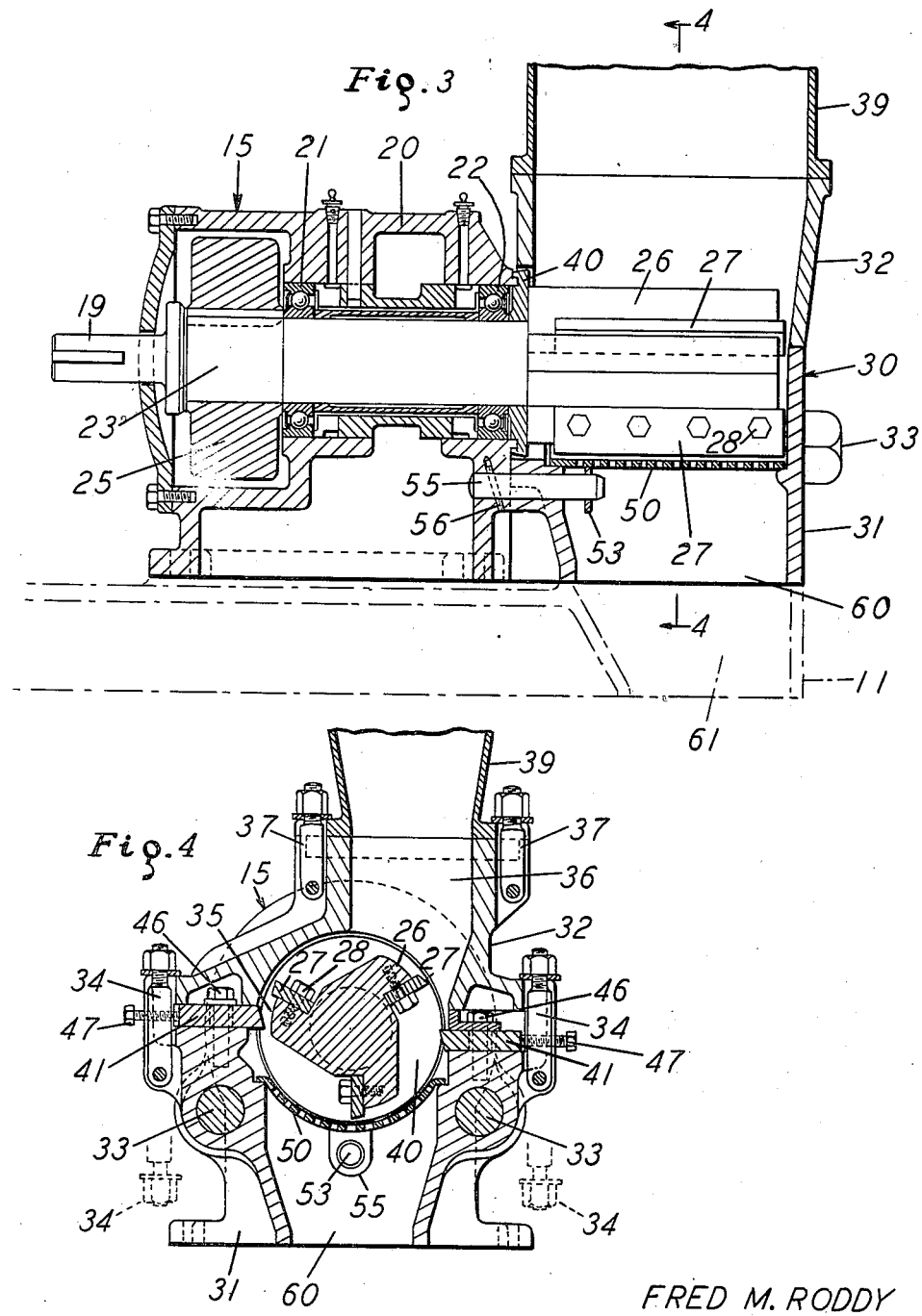

Aug. 10, 1943.   F. M. RODDY   2,326,682
ROTARY CUTTING AND GRANULATING MACHINE
Filed Jan. 7, 1942   3 Sheets-Sheet 3
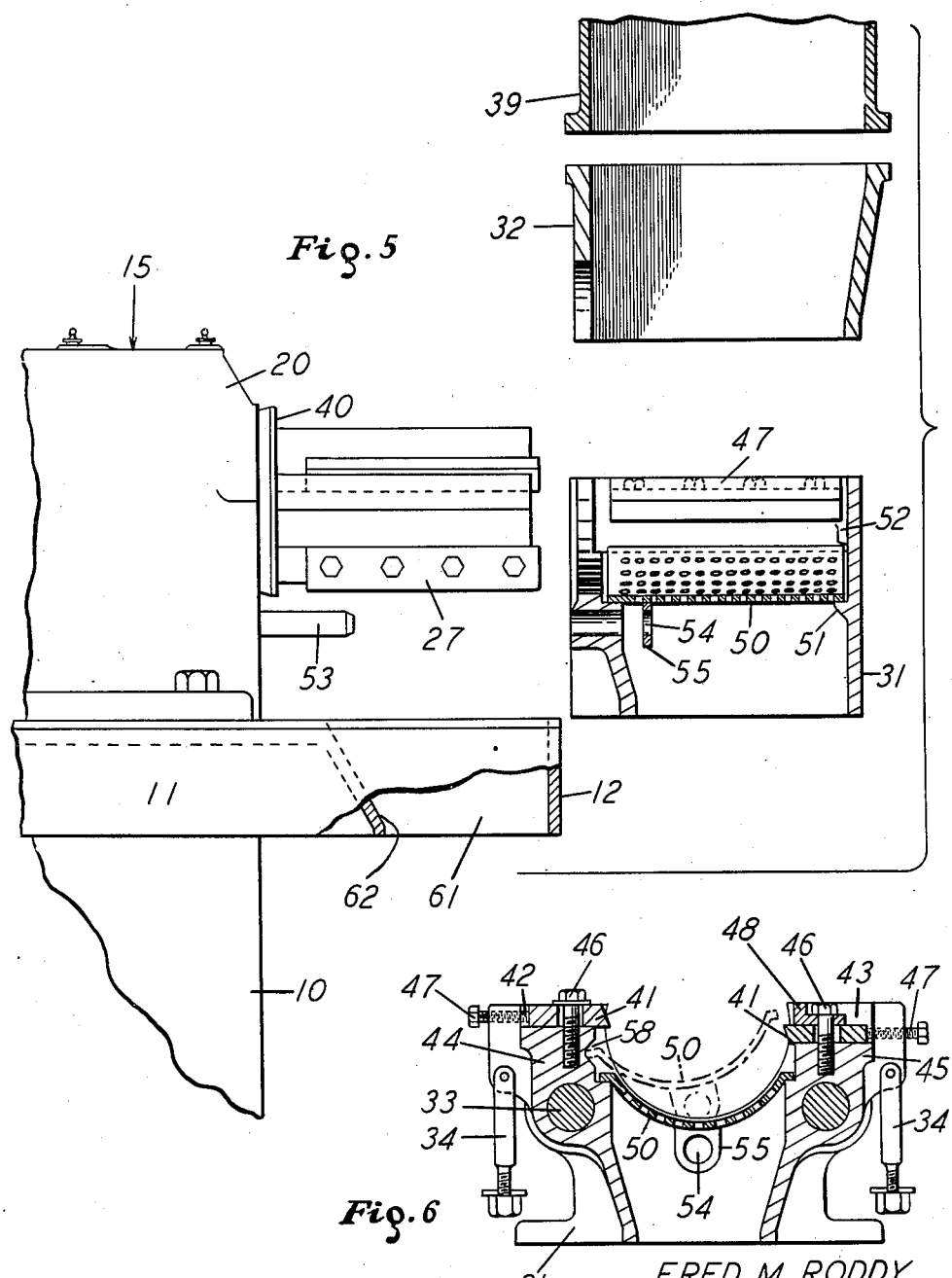
FRED M. RODDY
INVENTOR
By W. Russell Greenwood
ATTORNEY Patented Aug. 10, 1943

2,326,682

UNITED STATES PATENT OFFICE 2,326,682

ROTARY CUTTING AND GRANULATING MACHINE

Fred M. Roddy, Providence, R. I.

Application January 7, 1942, Serial No. 425,922

5 Claims. (Cl. 83—6)

This invention relates to rotary cutting and granulating machines and, in particular, to a rotary cutting machine especially adapted for the cutting of plastics, for example scraps of thermoplastic materials, to reduce them to predetermined degrees of fineness.

Machines for cutting plastics, for example thermoplastic materials, require a more sturdy and rigid construction than has been employed hitherto in the design of previous cutting machines of this type which operated on materials considerably less difficult to cut than plastics. Also, the cutting chambers of machines employed in the cutting of plastics should be as compact as possible so as to stir as small an amount of the material being cut as possible without preventing ready access to the stationary knives or of rendering cleaning of the machine difficult. Also, when the volume of the cutting chamber of the machine is small the material being processed does not remain long in the cutting chamber but is quickly reduced and passes through the screen. A cutting chamber of small volume therefore tends to avoid abrading the material by stirring or by agitation, thereby providing a percentage of dust which is undesirable in the product. On the other hand, if the cutting chamber has a large volume the material is often stirred in the machine so long that it becomes hot and plasticizes, choking the machine. It has been found that machines having cutting chambers of but small volume can operate completely full of material without overheating. This is not possible with older types of rotary cutting machines.

It has been and is necessary after cutting plastics of various colors to clean the interior cutting chambers of the machine when changing from one color to another since a certain amount of dust is produced in the cutting and granulating of plastics and the fines and dust produced frequently collects in all cracks and crevices that may be present in the cutting chambers of the machine. Machines which are used for cutting of plastics therefore should be designed with an effort to eliminate cracks and crevices in the cutting chambers, and also all parts of the machine contacted by the plastics should be made easily accessible in order that the machine may be readily cleaned. Ease of cleaning therefore becomes of extreme importance in machines which are used for granulating plastics.

One object of the invention is to provide a machine for cutting plastics having a more sturdy and rigid construction than has heretofore been employed on machines of this type and therefore less apt to be injured by rough usage.

Another object of the present invention is to provide a machine of this class in which the cutting chambers are as compact as possible and devoid of cracks and crevices.

Another object of the invention is to provide a machine of this class in which the adjustable stationary knives will be located for convenience of adjustment and ease of cleaning of the machine.

Another object of the invention is to relieve the operator of the necessity of lifting or supporting the weight of the lower half of the end casing while dismantling the machine for cleaning.

Another object of the invention is the attachment of the lower half of the end casing of the machine to the main frame housing rotatably supporting the rotor, whereby the attaching means for the lower half of the end casing will also act to locate it accurately in position and insure that the stationary knife adjustment will not be altered when the lower half of the end casing is removed and reassembled.

Another object of the invention is to provide a construction which avoids putting the stationary knives in machined slots as has characterized the construction of previous machines of this class.

Another object of the invention is the removal of the screen by lifting it up and out from between the stationary knives of the lower half of the end casing without alterating the adjustment or removing said knives.

With these and other objects in view as will be apparent in the following specification the invention consists in the novel construction and combination of the several parts as will be hereinafter fully set forth, and pointed out in the claims appended hereto.

In the accompanying drawings:

Fig. 1 is a side elevational view of a motor-driven rotary cutting machine embodying my invention;

Fig. 2 is an end view of the cutting machine shown in Fig. 1 as viewed from the right;

Fig. 3 is a central longitudinal sectional view of the rotary cutter unit of the cutting machine shown in Fig. 1;

Fig. 4 is a transverse sectional view taken substantially on the line 4—4 of Fig. 3;

Fig. 5 is a diagrammatic view partly in section of the rotary cutter unit shown in Fig. 3 with the hopper and upper casing being represented in a detached position from the main housing frame of the cutter unit; and Fig. 6 is a transverse sectional view of the bottom end casing member after removal from the cutter unit with one of the screens being depicted in one position of disassembly.

Generally speaking, the present invention comprises a rotary cutter having an end casing formed of two half casing sections superimposed one upon the other and providing a cutting chamber within which rotates the rotary cutting means. The casing is mounted upon an extension of a table member and overhangs one side of the base which carries the table. The lower half of the end casing is supported by the extension of the table but instead of being affixed thereto it is attached to the front end of the bearing frame for the knife rotor by two large horizontal bolts which serve not only as attaching bolts but also as dowels to locate the lower half of the end casing in position while being assembled and thereby insure that the setting of the stationary knives carried by the lower half of the end casing will not be altered when the lower half of the end casing is removed and reassembled. In this machine there are two adjustable stationary knives which are arranged in the lower half of the end casing at substantially diametrically opposite positions on the cutting circle of the rotary cutting means, and each of these stationary knives are mounted upon a knife bed, the surface of which is accurately machined and scraped whereby an accurate fit is obtained so that no powdered plastic material or dust from the cutting operation can enter and lodge beneath the knives. A closure ring is carried by the rotor at the end of the casing near the bearing housing for the rotor, and the upper and lower halves of the end casings are bolted together and bored accurately so as to give a small clearance between this bore and the closure ring so that both the dust leaking outwardly from the cutting chamber around the closure ring and any lubricant that may leak from the forward anti-friction bearing supporting the rotor will be thrown off into space exteriorly of the machine by centrifugal force upon impingement with the outer periphery of the closure ring. A screen is removably mounted in the lower half of the end casing and the screen may be removed by lifting it out from between the stationary knives after the lower half of the end casing has been removed from the table after removal of the two large horizontal bolts that attach the lower half of the end casing to the bearing housing for the rotor.

Referring now to the drawings, particularly to Figs. 1 and 2, a base 10 includes an enlarged upper table member 11 which projects outwardly for a considerable distance beyond one end of the base and presents the overhanging outward extension 12. Mounted at one end portion of this upper table member 11 so as to be partially supported by the extension 12 thereof and to partially overhang the base 10 is the novel rotary cutter of the present invention which is generally designated by the reference numeral 15. Suitable driving means for the cutter 15, here shown as an electric motor 16 provided with a drive shaft 17, is mounted upon the other end portion of the table member 11. The drive shaft 17 is drivingly connected through flexible coupling 18 with the rotor shaft 19 of the cutter 15.

The rotary cutter 15 has a main frame housing 20 containing suitable anti-friction bearings 21 and 22 (see Fig. 3) in which is journaled the rotor shaft 19. The rotor shaft 19 is of a generally stepped formation and it extends entirely through the main frame housing bearing support frame 20. Mounted upon and secured to the enlarged cylindrical body portion 23 of the rotor shaft 19 is a flywheel 25 which is of suitable size and weight for overcoming the shocks due to cutting, and for preventing excessive vibration of the machine during running. Formed integrally with and extending axially from one end of the body portion 23 of the rotor 19 is the knife carrying head of the rotor comprising a plurality of radial rotor arms 26, here shown as three in number (see Fig. 4) although any desired number may be employed, upon which are mounted and secured thereto by suitable fastening devices the rotor knives 27. In the illustrated embodiment, the knives 27 are on one end of the rotor and they overhang the bearings for the rotor shaft. As shown, each of the rotor knives 27 is secured to the rotor head by a plurality of bolts 28 which pass through suitable holes in the knife and are threaded into the associated rotor arm 26.

A sectional end casing generally designated by the reference numeral 30 is provided within which the rotor knives 27 revolve. In the form shown in the drawings, this casing 30 is composed of the two separable end casing members 31 and 32, the lower casing member 31 being detachably secured to the adjacent end of the main frame housing 20 by two large bolts 33. The bolts 33 are preferably designed to fit closely in both the machine end casing 31 and the main frame housing 20, so that they serve not only as attaching bolts for the lower end casing 31 but also as dowels to locate the lower end casing 31 accurately with respect to the housing 20 and the rotor head thereby insuring that the adjustment of the stationary knives, hereinafter to be described, will not be altered when the lower end casing 31 is removed and reassembled. The upper end casing 32 is mounted upon the lower end casing 31 and is detachably secured thereto by clamping swing bolts 34 which are pivotally mounted in external recesses at opposite sides of the end casing 31. The bottom of the upper casing 32 is formed with a semi-cylindrical recess which is concentric with the circular path of the rotor knives 27 and forms the upper part of the cutting chamber 35 of the machine. The upper end casing or cover 32 is provided with an inwardly extending feeding conduit 36 offset laterally to the right as viewed in Fig. 4 from a vertical plane of the axis of rotation of the rotor 19 and the lower end of the conduit 36 opens into the cutting chamber 35.

Communicating with the upper end of the feeding conduit 36 and removably fastened to the upper end of the upper casing member 32 by clamping swing bolts 37 which are pivotally mounted in suitable external recesses at the opposite sides of the upper casing, is a feed hopper 39 of any suitable construction.

At the end of the casings 31 and 32 where they confront the main frame housing 20 a closure ring 40 is provided on the rotor shaft; and clearance in the form of an open space is provided around the closure ring 40 so that both the dust leaking from the cutting chamber and any lubricant that may leak from the forward anti-friction bearing 22 will be thrown off into space by the action of centrifugal force when it reaches the outer periphery of the closure ring and thus cannot work into the cutting chamber to contaminate the plastic material being cut therein.

The lower end casing 31 carries the two beveled stationary knives 41, the arrangement of which constitutes one of the novel features of the machine, and the knives 41 are positioned at opposite sides of the rotor head and have the tips of their cutting edges lying in a horizontal plane containing the axis of the rotor and also disposed on the cutting circle of the rotary knives 27. As shown in Figs. 4 and 6 the stationary knives 41 are located within longitudinal recesses 42 and 43 formed in the upper edge portion of the side walls 44 and 45 respectively of the lower casing member 31, and the knives 41 are adjustable and bolted in place by bolts 46 which pass through suitable slots in the knives. Set screws 47 are provided which prevent the knives 41 from backing away from the rotor during the cutting operation and also serve as a means for adjusting the stationary knives inward to the rotor knives. The knives 41 have substantially duplicate structures, and in order to provide for the alignment of their cutting edges when they are mounted in place at opposite sides of the rotor, the recess 43 is made deeper than the opposite recess 42 to form a lower knife bed for the inverted knife. An L-shaped bar 48 bolted in place by the bolt 46 securing the inverted knife fills the space between this knife and the top of the casing 31.

The surfaces under the stationary knives 41 are accurately machined and scraped so that when the knives are securely bolted in place in the recesses 42 and 43 it will be impossible for powdered plastic material to work underneath the knives and become lodged between the knives and their supporting surfaces or seats. Similarly the surfaces beneath the rotor knives 27 are scraped to fit these knives which, in addition, are well fitted at the back where they contact the rotor so that no material can lodge underneath, or at the back sides, of the rotor knives.

Mounted on suitable ledges inside the lower end casing 31 and readily removable therefrom when the lower casing is disassembled from the main frame housing 20, as indicated in Fig. 6, is an arcuate bottom screen 50 of any desired mesh. The curvature of the inner face of the screen 50 is concentric with the cutting circle of the rotor knives 27 and the screen is slightly spaced therefrom and forms the bottom of the cutting chamber 35 of the machine. In practice, a set of interchangeable screens of different mesh may be employed so that the plastic material being cut will be held back in the cutting chamber until it is chopped to a desired particle size to pass through the screen.

The screen is securely held in position by lugs 51 and 52 at the forward closed end of the lower end casing 31, see Fig. 5, and by a pin 53 at the other end of the lower end casing 31, the pin 53 extending through a hole 54 in an ear 55 welded or otherwise secured to the under side of the screen 50 when the casing is pushed back axially. The pin 53 is fixedly secured by a dowel 56 to the main frame housing 20 and, when the lower end casing 31 is removed from the machine as depicted in Fig. 5, this pin no longer engages the ear 55 underneath the screen but instead projects forwardly beyond the front end of the housing 20 as shown in this figure.

To remove the screen from the lower end casing 31 of the machine, the end of the screen 50 carrying the ear 55 is lifted slightly and the screen worked backward until it is free of the lugs 51 and 52 at the forward end of the casing 31. As indicated in Fig. 6, the left edge of the screen is lifted up and the screen swung sidewise until this edge is received in the groove 58 in the inner face of the side wall 44 of the casing 31. The screen 50 is then swung upwardly about this edge as a pivot and lifted out between the stationary knives 41 carried by the lower end casing 31. Insertion of the screen is accomplished by reversal of these steps.

The lower end casing 31 is provided with a delivery conduit 60 which discharges the cut and screened plastic material into a chute opening 61 beneath the casing 31 and formed in the extension 12 of the table member 11. An inclined baffle 62 in the chute opening serves to deflect the discharged material forward, allowing more room to insert a large drum or other container under the chute opening through which the processed material issues.

The main frame housing 20 is bolted to the table member 11 but the lower end casing 31 itself is not bolted to the extension 12 of the table member 11 but instead it is secured to the machine frame housing 20 solely by the dowel bolts 33 and this overhung extension 12 merely serves the purpose of supporting the weight of the lower end casing while the workman dismantling the machine is unscrewing the two large bolts 33 that serve to attach the lower end casing 31 to the main frame housing 20 of the machine.

The operation of the machine is as follows: Assume a screen 50 of the desired mesh to be in place in the lower end casing 31. The plastic material to be cut is then introduced into the hopper 39 and passes therefrom into the cutting chamber 35. As soon as the plastic material is chopped to the desired particle sizes to pass through the screen 50 it is discharged from the conduit 60 and through the chute opening 61 into a drum, barrel or other container. After a batch of the plastic material has been processed the interior of the cutting chamber may be made readily accessible for the purpose of cleaning, as for the removal and sharpening of the knives or for the removal and the substitution for the screen 50 of another screen having a greater or less number of holes, either by unloosening and swinging aside the swing bolts 34 and removing the upper end casing 32 and hopper 39 together as a unit or by first dismantling the hopper 39 by releasing the swing bolts 37 and then removing the upper end casing 32. In both instances, the removal of the lower end casing 31 then is effected by unscrewing the two large bolts 33 and sliding the lower casing 31 bodily to the right of the position shown in Fig. 3 to that depicted in Fig. 5 thereby affording easy access to the stationary knives 41, screen 50 and other parts which are carried by the lower end casing 31.

While the invention has been described with particular reference to the cutting of plastics it will be understood that it is not limited to a machine for operating upon said types of materials, as the machine is suitable for cutting, chopping, granulating or shredding to a predetermined fineness a wide variety of materials such as grain, rubber, leathers, bark, roots, tobacco, paper, rags, etc.

Various modifications will be apparent from the foregoing description to those skilled in the art, and it is intended that the invention be limited only by the scope of the appended claims.

I claim:

1. A rotary cutting or granulating machine comprising an overhanging support, a bearing housing, a rotor shaft journaled in said housing and having an end portion overhanging one end of said housing, and disposed above said overhanging support, knives carried by said overhanging end portion of said rotor shaft forming a rotary cutter, an end casing on said overhanging support enclosing and forming a cutting chamber about said rotatable knives, said casing comprising upper and lower separable end casing members, two knives within said lower end casing member arranged at opposite sides of said rotary cutter in cooperative relation thereto, a screen beneath and spaced from said rotary cutter and supported by said lower end casing member, and means detachably securing and accurately locating said lower end casing on the end of said housing, said lower end casing resting on but being unattached to said overhanging support and, when disconnected from said bearing housing, being removable in a direction axially of said rotary cutter for cleaning of the machine.

2. In a rotary cutting or granulating machine, an overhanging support, a main bearing housing, a rotor shaft journaled in said housing, a knife head integral with said rotor shaft in overhanging relationship with respect to one end of said housing, knives carried by said knife head, a casing on said overhanging support composed of separable upper and lower end casings enclosing said rotor knives, a pair of opposed stationary knives in said lower end casing arranged to coact with the knives on the knife rotor, a curved screen in said lower end casing beneath and spaced from said rotor knives, said screen forming with the interior wall surfaces of said upper end casing a cutting chamber about and spaced from said rotor knives, a feed hopper on the upper end casing arranged to discharge the material to be cut through said upper end casing into said cutting chamber, chute means in said overhanging support communicating with said lower end casing for discharging and deflecting the cut material forwardly therefrom after passing through said screen, swing bolts demountably securing said upper and lower end casings together, and means detachably securing and accurately locating said lower end casing to the end of said housing, said lower end casing resting on but being unattached to said overhanging support and slidably supported thereby for removal bodily in an axial outwardly direction to facilitate cleaning of the machine.

3. In a rotary cutting or granulating machine, an overhanging support, a main bearing housing, a rotor shaft journaled in said housing, a knife head integral with said rotor shaft in overhanging relationship with respect to one end of said housing, knives carried by said knife head, a casing on said overhanging support composed of separable upper and lower end casings enclosing said rotor knives, a pair of opposed stationary knives in said lower end casing arranged to coact with the knives on the knife rotor, a curved screen in said lower end casing beneath and spaced from said rotor knives, said screen forming with said upper end casing a cutting chamber about and spaced from said rotor knives, a feed hopper arranged to discharge the material to be cut through said upper end casing into said cutting chamber, chute means for discharging and deflecting the cut material forwardly from said lower end casing after passing through said screen, swing bolts demountably securing said upper and lower end casings together, and fastening devices removably securing and accurately locating said lower end casing to the end of said main bearing housing, said fastening devices consisting of a pair of large horizontal dowel bolts which not only serve to attach said lower end casing to said main bearing housing but also act as dowels for accurately positioning said lower end casing with respect to said housing and for insuring that the adjustment of the stationary knives will not be altered during reassembly of said lower end casing with said housing after removal therefrom, said lower end casing being unattached to said overhanging support and when disconnected from said bearing housing being removable in a direction axially of said knife rotor for cleaning of the machine.

4. In combination, a base, a table mounted upon said base of greater length than the base and overhanging one end thereof for a considerable distance, and a rotary cutting machine mounted upon the end portion of said table presenting the overhanging part thereof, said cutting machine comprising a main bearing housing fixedly secured to said table, a rotor shaft rotatably mounted in said main bearing housing and having an end portion extending outwardly in overhanging relationship to one end of said housing to form a knife head, knives carried by said knife head forming a rotary cutter, an end casing on said overhanging table section about said rotor knives composed of upper and lower separable casing members constructed and arranged to form a cutting chamber within which said rotor knives operate on the material to be cut, said lower end casing having knives projecting inwardly thereof from opposite sides of said rotary cutter in cooperative relation thereto, said lower end casing being unattached to the overhanging part of said table, and means detachably securing and accurately locating said lower end casing on the end of said main bearing housing so that when disconnected therefrom the lower end casing member will be supported entirely by said overhanging portion of said table as the casing is slidably moved thereon in being removed from the machine in an endwise direction therefrom.

5. In combination, a base, a table mounted upon said base of greater length than the base and overhanging one end thereof for a considerable distance, a rotary cutting machine mounted upon the end portion of said table presenting the overhanging part thereof, and driving means operatively connected to said cutting machine and mounted upon the other end portion of said table, said cutting machine comprising a main bearing housing fixedly secured to said table, a rotor shaft rotatably mounted in said housing and having an end portion extending outwardly in overhanging relationship to one end of said housing to form a knife head, knives carried by said knife head forming a rotary cutter, an end casing on said overhanging part of the table enclosing said rotary cutter and composed of upper and lower separable casing members constructed and arranged to form a cutting chamber within which said rotor knives operate on the material to be cut, said lower end casing having two knives projecting inwardly from opposite sides of said rotary cutter in cooperative relation thereto, said lower end casing being unattached to said table, two dowel bolts detachably securing said lower end casing to and accurately locating it on one end of said main bearing housing so that when said lower end casing is disconnected therefrom it will be supported entirely by said overhanging portion of said table as the lower end casing is removed from the machine in an endwise direction therefrom, and a chute in said overhanging part of the table constructed and arranged to deflect the cut material forward as it passes downwardly from said cutting chamber.

FRED M. RODDY.